United States Patent Office 3,148,448
Patented Sept. 15, 1964

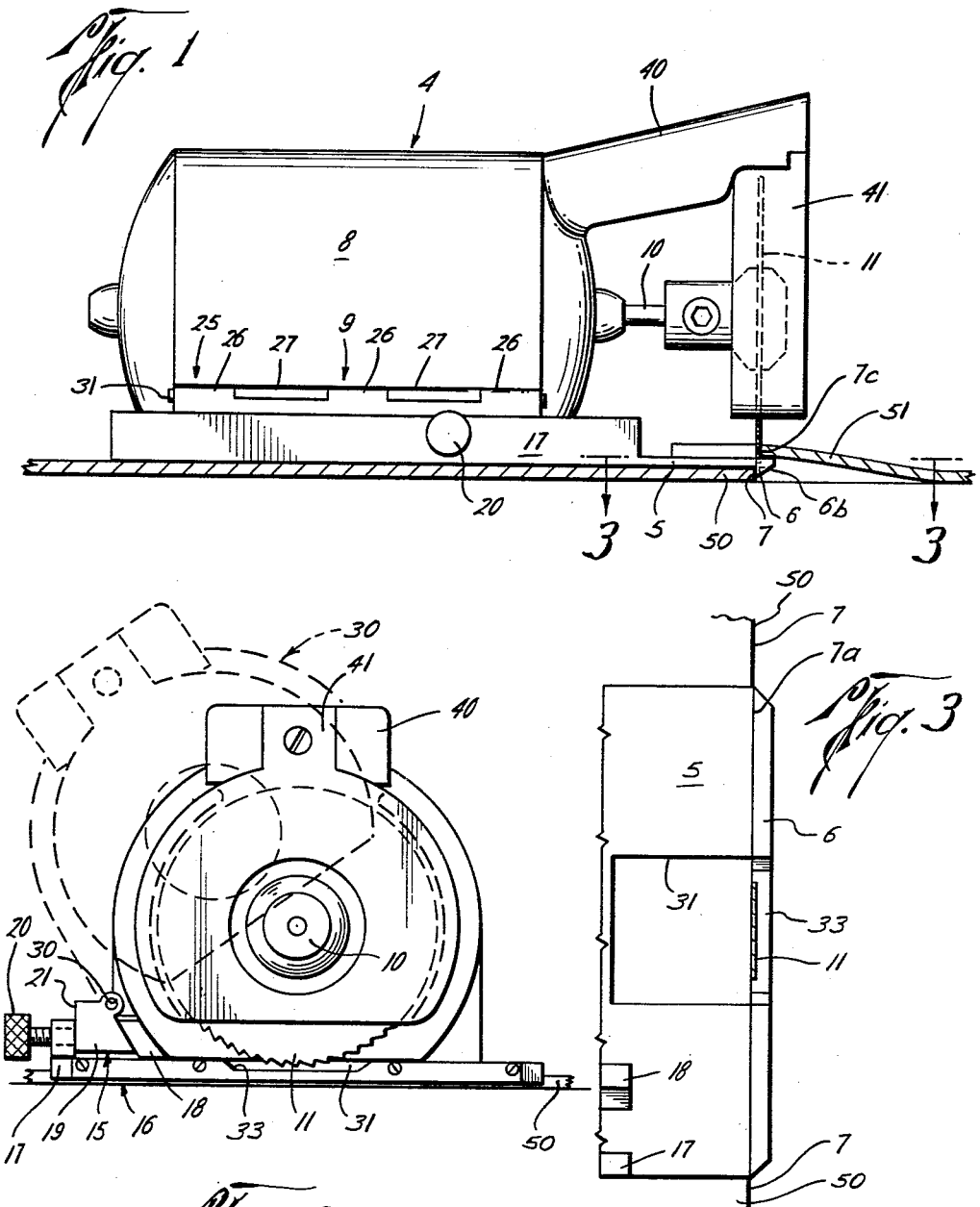

3,148,448
MANUAL POWER OPERATED CUTTER
Glen R. Gragg, 7141 Vanderman, Houston 17, Tex.
Filed July 30, 1962, Ser. No. 213,505
1 Claim. (Cl. 30—276)

The present invention relates to a cutter, and more particularly, to a manually movable cutter for trimming and cutting linoleum, plastic tile, and the like.

At the present time, no satisfactory method is provided for accurately trimming the edges or cutting linoleum, plastic tile, and the like. The linoleum or tile layer must, at the present time, use a knife and pull it along a surface or edge and endeavor to mate or match the cut linoleum with the edge of adjacent tile or trim.

This method is extremely undesirable and time consuming and does not always present a neat close fitting appearance as may be desired.

The present invention provides a means whereby tile or linoleum or the like may be quickly and easily trimmed or clipped so as to provide a smooth snug fit with an adjacent tile, wallboard, or trim.

Still another object of the present invention is to provide a cutter for plastic tile, linoleum, and the like which is pivotally mounted on a base so that it can be easily positioned on the tile or linoleum and moved along an adjacent edge while cutting a tile or linoleum to be fitted therewith.

Still another object of the present invention is to provide a plastic tile or linoleum cutter which includes a base plate, a depending lip thereon for guiding the cutter along an edge against which the tile or linoleum is to fit, a motor pivotally mounted on the base with a cutter carried by the motor, and means to adjust the motor and cutter in relation to the edge of the tile along which the base plate is to be moved for trimming or cutting tile.

Still another object of the present invention is to provide a small compact cutter which may be manually and easily moved along a linoleum, plastic tile, or the like for cutting or trimming an edge thereof.

Other objects and advantages of the present invention will become more readily apparent from a consideration of the following descriptions and drawings wherein:

FIG. 1 is a side view of the present invention showing it in position for use;

FIG. 2 is a front end view and shows in dotted line the manner in which the motor may be tilted; and FIG. 3 is a sectional view, partly in elevation, on the line 3—3 of FIG. 1.

In FIG. 1, the invention is referred to generally by the numeral 4 and is shown as including a base plate 5 having secured along one edge and depending downwardly therefrom the lip or guide 6 which is adapted to move along the edge 7 of tile, linoleum, or a baseboard or the like as will be described in greater detail hereinafter. A motor 8 is pivotally mounted as generally indicated at 9 to be carried on the base plate, the shaft 10 of the motor having secured thereto a rotary cutter 11 for cutting or trimming the edge of plastic tile or linoleum as the device is moved along the tile or linoleum as will be described in greater detail hereinafter.

In order to adjust the motor and cutter relative to the base plate or base 5 and relative to the guide or lip 6, suitable means as indicated generally by the numeral 15 are provided. Such means includes the guide way designated generally by 16 which is secured on the base 5 generally perpendicular relative to the lip 6. The guide way 16 includes the upstanding members 17 and 18 which are spaced, and one of which, such as the upstanding member 18, may be inclined for forming a guide way or guide track to receive the guide 19 which fits snugly therein. The guide 19 is adapted to slide between the members 17 and 18 and may be held in any position between the members 17 and 18 by the thumbscrew 20 which is threadedly secured through the upstanding member 17 of the guide trace 16 to abut the edge or surface 21 of the guide 19 as more clearly seen in FIG. 2 of the drawings.

The members 17 and 18 may be secured on the base 6 by any suitable means such as screws or by welding or the like. As can be better illustrated in FIGS. 1 and 2 of the drawings, the guide 19 extends longitudinally and at one side of the motor 8 and is secured to the motor 8 by the pivot means generally referred to heretofore by the numeral 9. The pivot means includes the suitable hinge arrangement defined generally by the numeral 25 and including the interfitting portions 26 and 27 formed respectively on one upper edge of the guide 19 and depending downwardly from the motor 8 as illustrated in the drawings. The interfitting mating projections 26 and 27 on the guide 19 and motor 8 are provided with an opening 30' in which is adapted to be secured the pivot pin 31' for securing the motor and guide 19 together.

The foregoing arrangement permits the motor to be pivotally moved toward and away from the lip 6 as more clearly illustrated by the dotted line representation generally at 30 in FIG. 2 of the drawings.

As shown in the drawings, the plate or base 5 is rectangular in configuration and is grooved or recessed as illustrated at 31 at one end as better shown in FIG. 3. The opening 31 is provided so that the cutter 11 upon rotation will not engage the base 5. It is to be noted that the downwardly depending lip 6 is secured across the edge 7a of the base 5 and extends across the opening 31 as shown in FIGS. 2 and 3 of the drawings. The lip 6 may be secured to the edge 7 by any suitable means such as screws, as shown, or by welding or the like. The portion 33 of the lip 6 is recessed the extent of the opening or recess 31 in the base 5 to prevent engagement of the cutter 11 therewith upon rotation.

Extending forwardly from the motor 8 is a support 40 upon which may be secured the cutter guard 41. The cutter guard 41 may be secured to the support 40 by any suitable means such as by screws or if desired, may be pivotally mounted therewith. The cutter guard 41 surrounds the cutter 11 as illustrated in the drawings so as to inhibit contact of the cutter with the operator's hands when in use.

Any suitable size motor may be used for the present invention but a ⅙ or ⅛ horsepower motor may serve the purpose quite well. In unusual circumstances, a larger motor may be used where desired or if necessary.

To further illustrate the operation and use of the present invention, it will be assumed that it is desired to trim or cut a piece of linoleum so that it will fit against the edge 7 of the linoleum represented by the numeral 50 which has already been laid in position. To accomplish this, the invention 4 is placed on the linoleum 50 so that the base 5 rests thereon as shown in FIG. 1 with the depending lip engaging the edge 7 of the linoleum 50. The operator's hand may grasp the motor 8 and manually move it so that the depending edge or guide 6 guides the invention 4 along the edge 7 of the linoleum designated at 50 whereupon the cutter 11 engages the linoleum represented by the numeral 51 and trims it. It will be noted that the motor 8 and cutter 11 have been adjusted longitudinally of the base 5 so that the cutter is substantially in alignment with the edge 7 of the linoleum 50 whereupon the edge 7c of the linoleum 51 after it is cut will fit snugly thereagainst.

It may be desirable, and generally is necessary, to swing or pivot the motor 8 upwardly away from the linoleum 51 to be cut, and this position is illustrated in dotted line generally by the numeral 30.

The portion 6b of the lip 6 is tapered so as to avoid contact with the cement which has been used to hold 50 in place.

The present invention has as its primary purpose the provision of a power operated device for quickly and easily cutting seams or trimming any firm, but flexible, material up to and including 3/16 inch thickness. The material may be cut straight or along a predetermined path so as to closely fit an adjacent edge. Additionally, undesirable edges may be trimmed off with the present device before the seam is cut therein.

Broadly, the present invention relates to a cutter for cutting or trimming linoleum, plastic tile, or the like so that it will fit as desired.

What is claimed is:

A device for trimming the edge of linoleum, plastic tile and the like to provide a snug fit with material to be placed adjacent an edge thereof, comprising:

(a) a base,
(b) a depending lip extending downwardly from one side of the base for guiding the base along an edge of the material,
(c) a motor having a longitudinally extending parallel pivot mounted on the base,
(d) a cutter blade carried by said motor on the side of the base opposite to the side of the base having the depending lip therefrom and adapted to rotate in a plane parallel to said lip,
(e) means for receiving the linoleum or the like on said base above said depending lip and below said cutter blade,
(f) said pivotal mounting for said motor extending substantially perpendicularly relative to said lip enabling said motor and said blade carried thereby to swing upwardly away from said lip,
(g) means for adjusting said motor relative to said lip to position said cutter blade in relation to said lip,
(h) said last named means including a guide track mounted on said base,
(i) a guide fixed to said pivotal motor mounted and slidable along said guide track,
(j) a thumbscrew threadedly secured in said guide track for abutting said guide and locking it in a predetermined position, and
(k) said means for adjusting said motor relative to said lip positioning said cutter blade above said material and relative to the linoleum or like to be trimmed to move the cutter blade parallel to the plane of the lip and said edge of the material for cutting the linoleum or the like.

References Cited in the file of this patent
UNITED STATES PATENTS

| | | |
|---|---|---|
| 1,253,705 | Metzger | Jan. 15, 1918 |
| 1,598,070 | Faase | Aug. 31, 1926 |
| 1,737,552 | Altman et al. | Dec. 3, 1929 |
| 1,813,693 | Balinski et al. | July 7, 1931 |
| 2,275,733 | Clark | Mar. 10, 1942 |
| 2,487,327 | Ganter | Nov. 8, 1949 |
| 2,557,699 | Silver | June 19, 1951 |